US005829112A

United States Patent [19]

Blatt

[11] Patent Number: 5,829,112

[45] Date of Patent: Nov. 3, 1998

[54] METHOD FOR MANUFACTURING AN ENCLOSED POWER CLAMP

[75] Inventor: John A. Blatt, Grosse Pointe Shores, Mich.

[73] Assignee: ISI Norgren Inc., Anoka, Minn.

[21] Appl. No.: 756,075

[22] Filed: Nov. 25, 1996

[51] Int. Cl.[6] .............................. B23P 19/02; B25B 7/02; B23Q 3/08

[52] U.S. Cl. ................................ 29/416; 29/525; 269/32; 81/418

[58] Field of Search ......................... 29/416, 525, 525.01, 29/525.11, 525.02; 228/190, 189; 269/32, 31; 81/57.11, 57.14, 57.15, 57.19, 57.2, 418

[56] References Cited

U.S. PATENT DOCUMENTS

| | | | |
|---|---|---|---|
| 1,887,829 | 11/1932 | Vogl . | |
| 2,882,587 | 4/1959 | Unger et al. | 228/190 |
| 3,381,954 | 5/1968 | Blatt . | |
| 3,835,531 | 9/1974 | Luttmer | 228/189 |
| 4,396,183 | 8/1983 | Lymburner | 269/32 |
| 4,451,026 | 5/1984 | Coope | 269/24 |
| 4,458,889 | 7/1984 | McPherson et al. | 269/32 |
| 4,494,739 | 1/1985 | Valentine . | |
| 4,633,556 | 1/1987 | Santi | 29/416 |
| 4,719,682 | 1/1988 | Santi | 29/416 |
| 4,793,602 | 12/1988 | McPherson . | |
| 4,854,564 | 8/1989 | McPherson et al. . | |
| 4,905,973 | 3/1990 | Blatt . | |
| 5,031,483 | 7/1991 | Weaver | 76/107.1 |
| 5,215,295 | 6/1993 | Hoover | 269/32 |
| 5,351,584 | 10/1994 | Warheit . | |
| 5,575,462 | 11/1996 | Blatt . | |

FOREIGN PATENT DOCUMENTS

| | | |
|---|---|---|
| 0 437 862A2 | 7/1991 | European Pat. Off. . |
| 2 340 798 | 8/1980 | France . |
| 2 186 822 | 8/1987 | United Kingdom . |

*Primary Examiner*—A. L. Pitts
*Assistant Examiner*—Tisa Stewart
*Attorney, Agent, or Firm*—Young & Basile, P.C.

[57] ABSTRACT

A method for manufacturing an enclosed power clamp from individual planar plates which when stacked and secured in the proper manner provide an inexpensive, lightweight and structurally sound enclosed power clamp. The enclosed housing of the power clamp is defined and sectioned into a plurality of planar laminations. A plurality of planar plates are formed having configurations corresponding to the planar laminations. The planar plates are then stacked in a predetermined sequence corresponding to the planar laminations. The internal mechanisms of the power clamp are assembled to the planar plates of the power clamp, and the planar plates are secured together to form an integral unit of the power clamp.

38 Claims, 6 Drawing Sheets

METHOD FOR MANUFACTURING AN ENCLOSED POWER CLAMP

The present invention relates to enclosed power clamps, and more particularly, to a method of manufacturing an enclosed power clamp that stacks and secures a plurality of planar plates to form an inexpensive, light-weight power clamp.

BACKGROUND OF THE INVENTION

Power clamps are known of the type in which fluid motor actuated reciprocating movement is adapted to be translated into swinging movement of a clamp arm attached by an additional linkage or other force transmitting means to the end of a piston rod of the fluid motor. Normally, in the retracted position of the fluid motor, the clamp is in a released position, that is, the clamp arm is removed from the work supporting surface, and by means of fluid pressure, the clamp arm is pivotally moved into a clamping position to clamp a work piece to a work supporting surface and securely hold the work piece there against by means of fluid pressure in the fluid motor.

It is well known for such clamps to have a hollow body axially aligned with and connected to the fluid motor and mounted upon a first support, wherein the body is opened at the top, bottom and front and includes a pair of opposed, spaced side plates with their one ends out-turned and secured to the fluid motor. The open design of the hollow body allows entry of dirt and/or other foreign matter into the interior of the body which can create problems with the internal working mechanisms of the power operated clamp.

Other designs have remedied this problem by providing an enclosed power operated clamp that seals against particle intrusion and thus protects the internal mechanisms from undue wear and malfunction caused by abrasive particles and other adverse elements. Such enclosed power clamps typically utilize a pivoted clamp arm actuated by an internal linkage that is completely enclosed within the housing so that only a rotary shaft passing through a protective bushing extends between the completely enclosed linkage and an exposed exterior clamp arm.

Enclosed power clamps are typically fabricated from steel, cast iron or cast aluminum. Due to the nature of these materials, as well as the tolerances and the enclosed configurations required of an enclosed power clamp housing, enclosed power clamps are rather difficult and expensive to manufacture, especially the power clamp housings.

Thus, it would be desirable to provide an inexpensive and simple method for manufacturing a light-weight and structurally sound enclosed power operated clamp.

SUMMARY OF THE INVENTION

The present invention overcomes the above shortcomings by providing an inexpensive and simple method for manufacturing an enclosed power clamp that produces a light-weight and structurally sound enclosed power operated clamp. The present invention provides a method for sectioning the housing of the enclosed power clamp into a plurality of planar laminations and providing planar plates corresponding to those planar laminations. The present invention also provides means for forming predetermined configurations into each of the planar plates corresponding to the configurations of the planar laminations. A fine-blanking process is utilized to create and form the configurations in the planar plates that correspond to the planar laminations. The planar plates are stacked in a predetermined sequence corresponding to the planar laminations, and the internal mechanisms of the power clamp are assembled to the planar plates. A method of securing the planar plates together is utilized to form a unitary unit.

In securing the planar plates together to form an integral power clamp unit, the present invention provides a plurality of dowel rods extending through corresponding apertures provided in the planar plates. The dowel rods may be press fit into the corresponding apertures. In addition, a plurality of threaded fasteners may extend through the corresponding apertures and into the ends of the dowel rods.

In stacking the planar plates, the present invention provides for the sub-assembly of groups of planar plates to simplify the method of manufacturing the power clamp. In so doing, a second method for securing the planar plates may be utilized wherein the individual planar plates are brazened together to form integral, unitary groups of planar plates. In addition, the planar plates may be pierced so that protrusions are created in at least one of the planar plates for complementarily engaging corresponding apertures in an adjacent planar plate of the same group of planar plates.

The outer planar plates of the present invention are fabricated from a metallic material, such as a hardened steel, in order to provide the necessary structural support to the power clamp. The inner planar plates may be fabricated from a light-weight metal, such as aluminum, or a polymeric material in order to reduce the weight of the power clamp.

The present invention also provides for a sub-assembly of the internal mechanisms of the enclosed power clamp. The sub-assembly of the internal mechanisms is assembled to the planar plates and comprises of: a linear actuator for actuating the power clamp; a rod end connected to said linear actuator; a pair of opposed links pivotally coupled with said rod end; a shaft link pivotally coupled to said pair of links; a bearing cartridge for rotatably supporting said shaft link; and a flexible seal for sealing said shaft link with respect to said planar plates. The present invention may also provide, within the internal mechanism, a pre-stop bar extending between the planar plates to provide a positive stop to the shaft link during actuation of the power clamp. The present invention may also provide at least one clamp arm connected to the shaft link. In addition, a plurality of micro-switches may be mounted within the housing to sense the position of the rod within the power clamp.

To this end, the objects of the present invention are to provide an inexpensive and simple method for manufacturing an enclosed power clamp wherein the enclosed power clamp produced from said method is light-weight and structurally sound.

Other options and features of the invention will become apparent by reference to the following specifications and to the drawings.

BRIEF DESCRIPTION OF THE DRAWINGS

In the drawings, like reference numerals refer to similar elements throughout the various views.

DESCRIPTION OF THE PREFERRED EMBODIMENT

Figure 1:
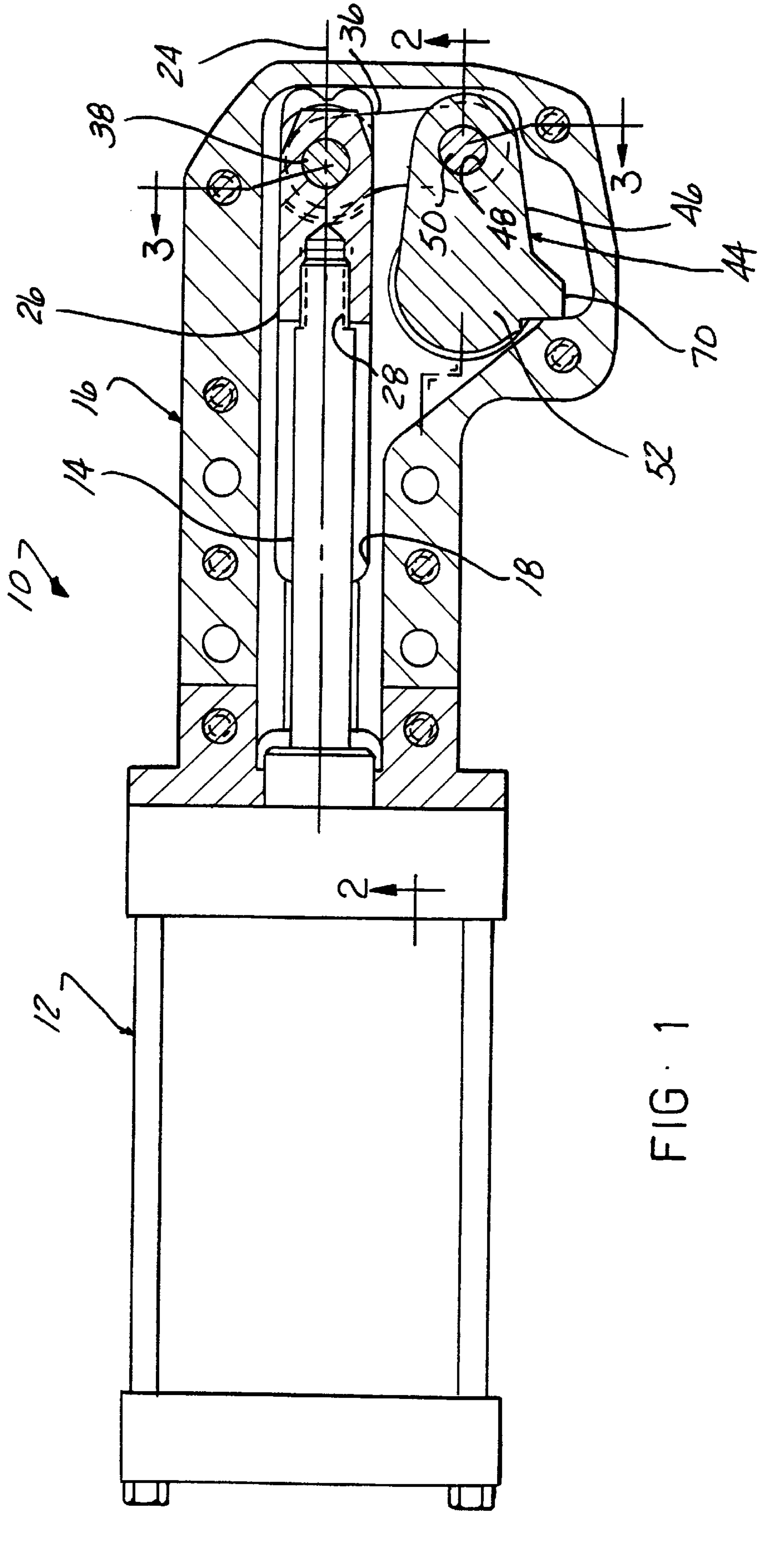
FIG. 1 is a longitudinal vertical cross sectional view taken along line 1—1 in FIG. 2.
Figure 2:
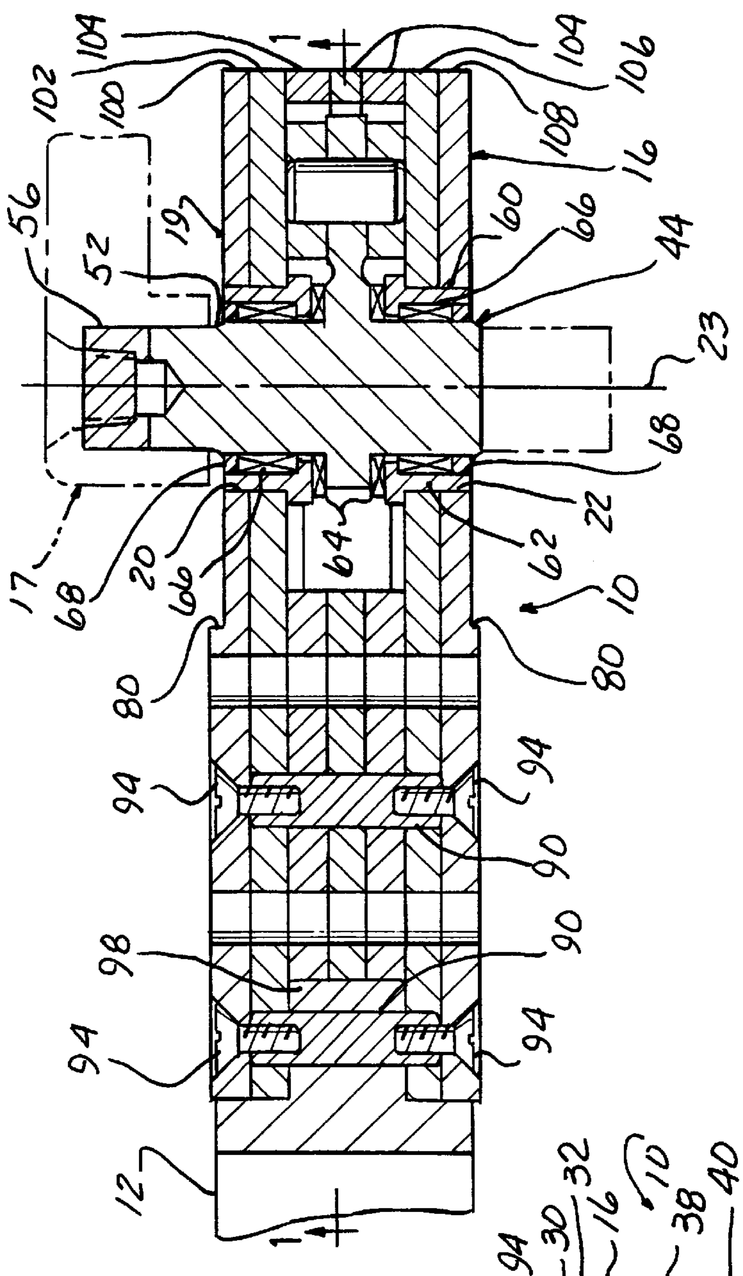
FIG. 2 is a transverse cross sectional view taken along lines 2—2 in FIG. 1.

Referring to the drawings, the present invention will now be described in detail with reference to the preferred embodiment.

Figure 8:
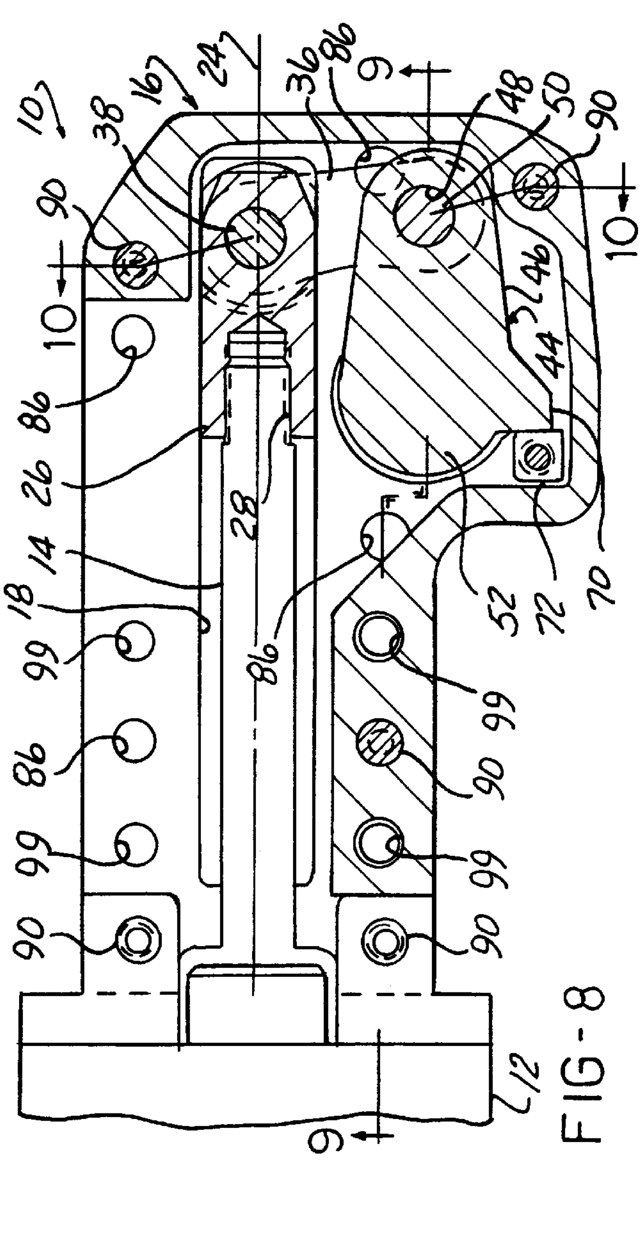
FIG. 8 is a longitudinal vertical cross sectional view of the power clamp shown in FIG. 9 taken generally through the center thereof.
Figure 15:
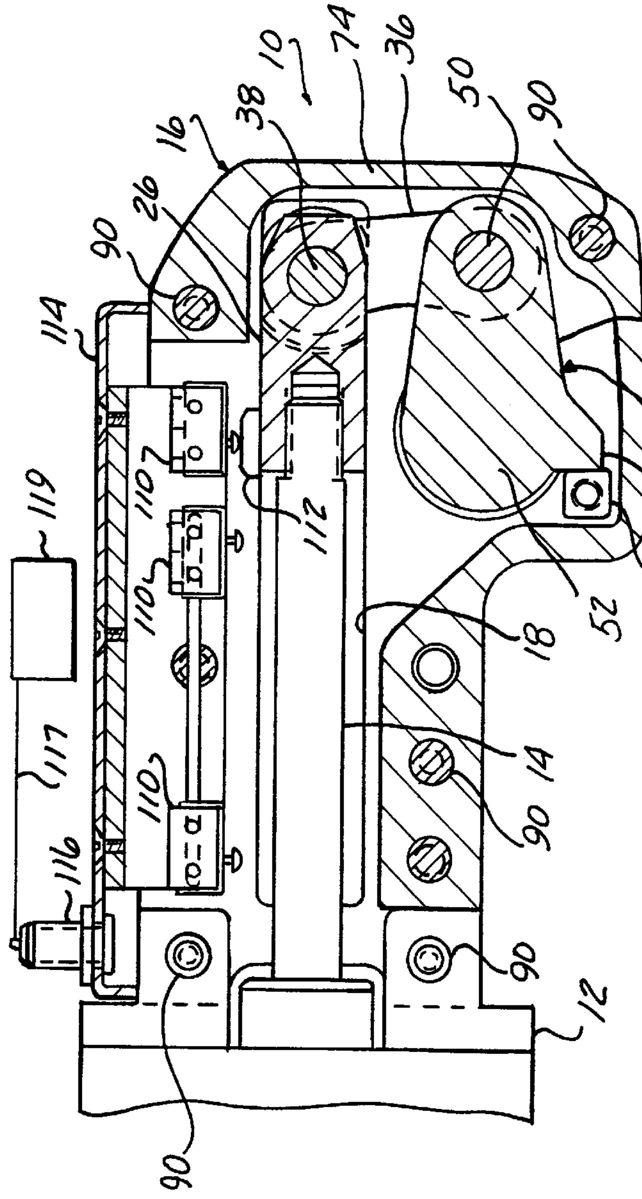
FIG. 15 is a longitudinal vertical cross sectional view of the power clamp taken generally through the center thereof and showing the mounting arrangement of several micro-switches.

FIGS. 1, 8 and 15 illustrate an enclosed power clamp 10 as defined in the present invention. The power clamp 10 is actuated by means of a fluid cylinder or linear actuator 12 having a piston (not shown) therein which is attached to a piston rod 14. The fluid cylinder or linear actuator 12 is preferably pneumatic, but the fluid cylinder or linear actuator 12 may also be hydraulic. The linear actuator 12 provides linear reciprocating movement to the piston rod 14 which in turn is coupled to the internal mechanism of the power clamp 10 enclosed within a housing 16 of the power clamp 10. The internal mechanisms of the power clamp 10 convert the linear motion of the piston rod 14 to rotary motion of a clamp arm 17.

The housing 16 of the power clamp 10 is attached to one end of the linear actuator 12 and is formed by a plurality of stacked planar plates 19, as will be described in detail later. The housing 16 is hollow with an elongated internal guide slot 18 extending the length of the housing 16. The one end of the housing 16 adjacent the linear actuator 12 is open to receive the free end of the piston rod 14 within the guide slot 18. The other end of the guide slot 18 is closed by the end portion of the housing 16. The housing 16 also includes a pair of coaxial apertures 20, 22 having a common axis 23 offset from and perpendicular to a longitudinal axis 24 of the guide slot 18.

Figure 3:
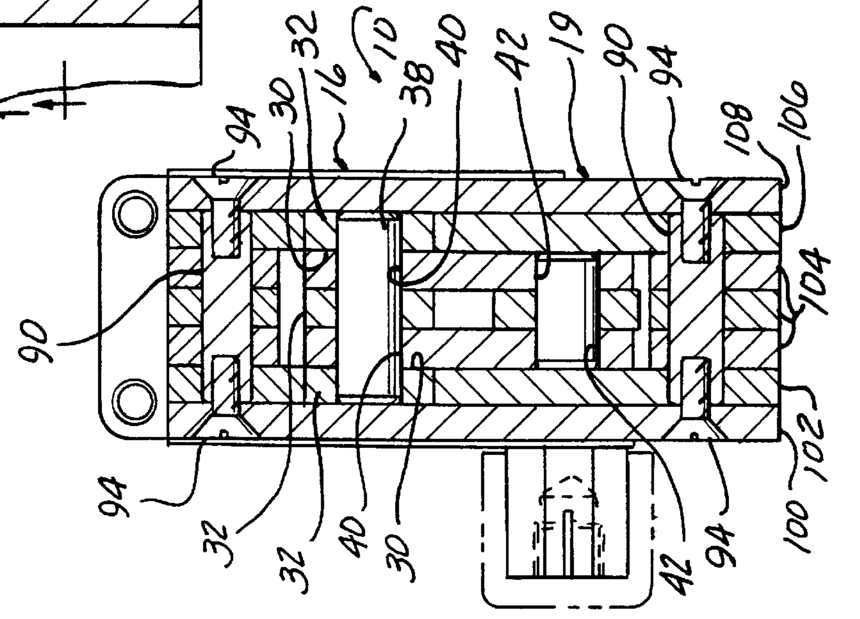
FIG. 3 is a transverse cross sectional view taken along line 3—3 in FIG. 1.
Figure 10:
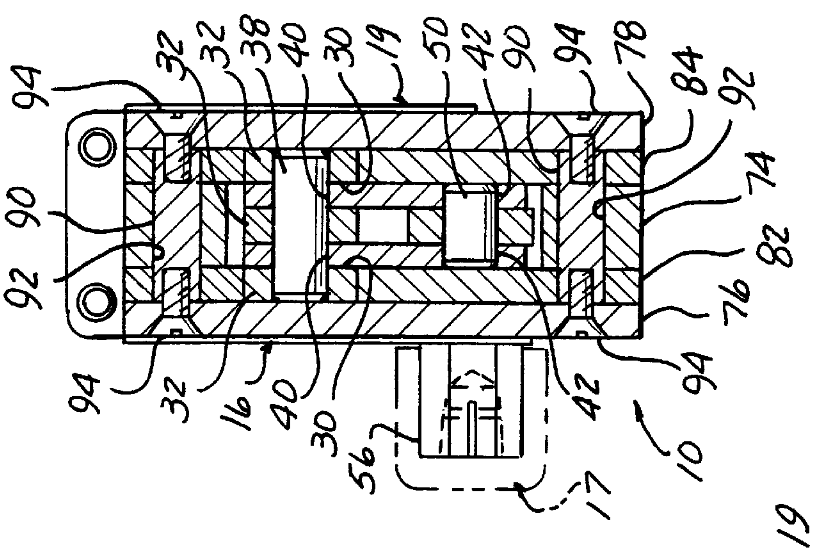
FIG. 10 is a transverse cross sectional view taken along line 10—10 in FIG. 8.

A rod end 26 is connected to the free end of the piston rod 14 for linear reciprocal movement within the guide slot 18. The rod end 26 generally has a rectangular cross section with beveled edges. A threaded aperture 28 is disposed within one end of the rod end 26 to threadingly engage the free end of the piston rod 14. The opposite end of the rod end 26 includes a pair of substantially parallel slots 30 formed by three substantially parallel opposed protruding portions 32 of the rod end 26, as seen in FIGS. 3 and 10. Three coaxial apertures 34 extend through the three extending protrusions 32 of the rod end 26.

In order to couple the internal mechanism of the power clamp 10 with the rod end 26, a pair of opposed links 36 are disposed within the slots 30 of the rod end 26 and extend outwardly therefrom, as seen in FIGS. 1, 3, 8 and 10. The pair of opposed links 36 are pivotally connected to the rod end 26 at one end with a pin 38. The pin 38 passes through the three coaxial apertures 34 provided in the rod end 26 and through a pair of coaxial apertures 40 provided in the pair of opposed links 36 to provide a pivotal connection between the rod end 26 and the pair of links 36.

The pair of opposed links 36 have a second pair of coaxial apertures 42 formed at the opposite end of the opposed links 36 for pivotally connecting the opposed links to a shaft link 44, as seen in FIGS. 1–3 and 8–10. The shaft link includes a lever arm 46 having an aperture 48 extending therethrough. A pin 50 is inserted through the coaxial apertures 42 in the opposed links 36 as well as through the aperture 40 in the lever arm 46 to provide a pivotal connection between the opposed links 36 and the lever arm 46 of the shaft link 44.

The shaft link 44 also provides a pivot pin 52 that is integrally connected to the lever arm 46. The pivot pin 52 is substantially cylindrical and is rotatably disposed within the pair of coaxial apertures 20, 22 for angular movement about the common axis 23. The pivot pin 52 has at least one end 56 extending outwardly from the housing 16 through apertures 20, 22. The pivot pin 52 is rotatably supported in the housing 16 by a bearing cartridge 60 wherein the bearing cartridge 60 includes a bushing 62 adjacent the portion of the housing 16 defining the coaxial apertures 20, 22. The bearing cartridge 60 also includes thrust bearings 64 and rotational bearings 66. A flexible O-ring seal 68 is provided at each end of coaxial apertures 20 and 22 to seal pivot pin 52 with respect to the housing 16. The shaft link 44 also provides a positive stop 70 integral with and extending from the lever arm 46. In the preferred embodiment, the stop 70 engages a stop block 72 having a longitudinal axis extending through the housing 16 in a direction parallel to axis 23. In an additional embodiment, the positive stop 70 engages an interior wall of the housing 16. In both embodiments, the positive stop 70 abuts a rigid surface to limit the travel of the clamp arm 17 in the clamped position. The internal mechanism of the power clamp 10 provides a combination of the rod end 26, the pair of opposed links 36 and the shaft link 44 to transform reciprocal movement of the piston rod 14 into angular movement of the clamp arm 17.

In order to produce an inexpensive and lightweight housing 16, the housing 16 includes a plurality of substantially planar plates 19. Each of the planar plates 19 has substantially the same thickness and substantially the same contoured perimeter to provide a cohesive, unitary housing 16. Several different embodiments will now be described with respect to the power clamp 10. Many of the elements remain unchanged between embodiments, and therefore, the same numerical identifier will be utilized for elements which remain unchanged between different embodiments.

Figure 11:
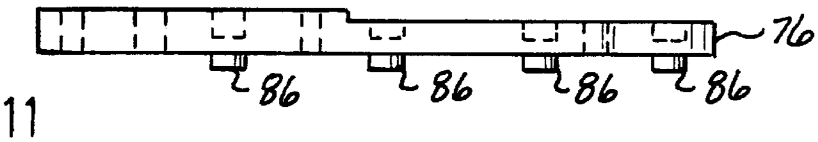
FIG. 11 is a side elevational view of the first or top planar plate of the power clamp shown in FIG. 9.
Figure 12:
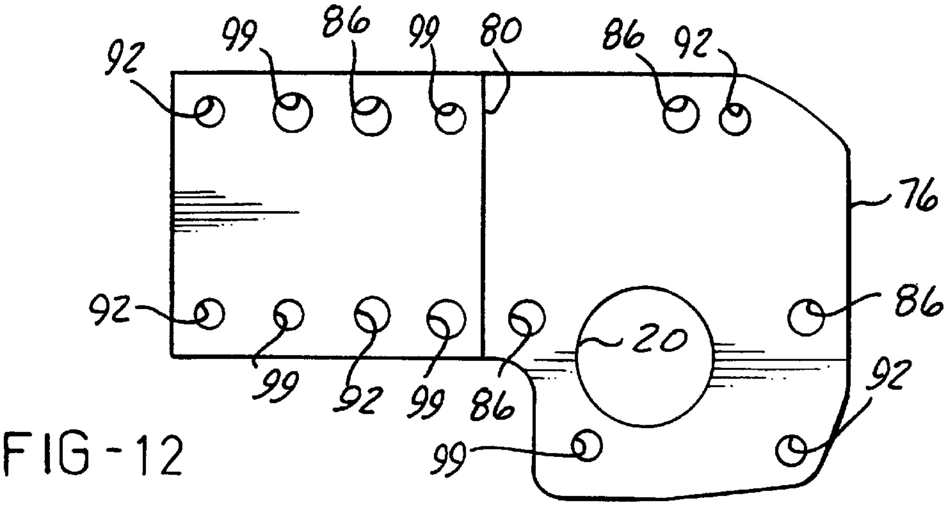
FIG. 12 is a top elevational view of the first or top planar plate in the power clamp shown in FIG. 9.
Figure 13:
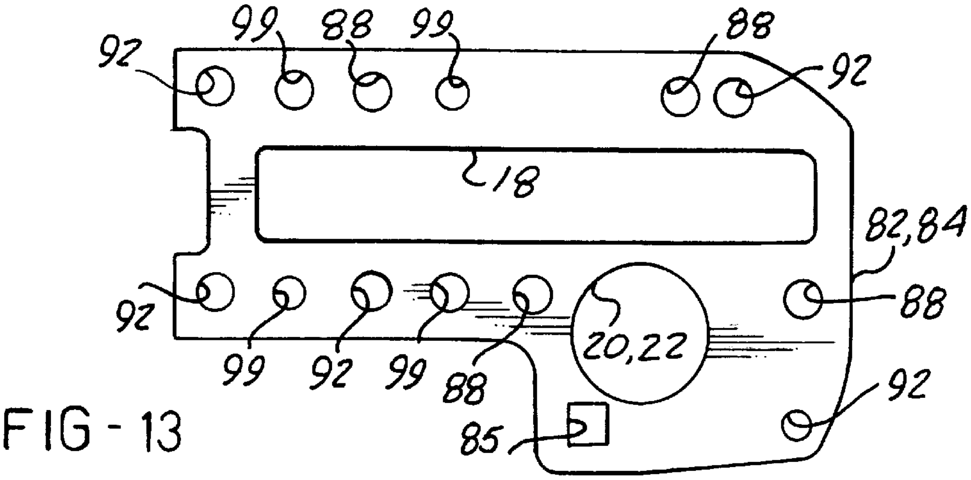
FIG. 13 is a top elevational view of the second and fourth planar plates of the power clamp shown in FIG. 9.
Figure 14:
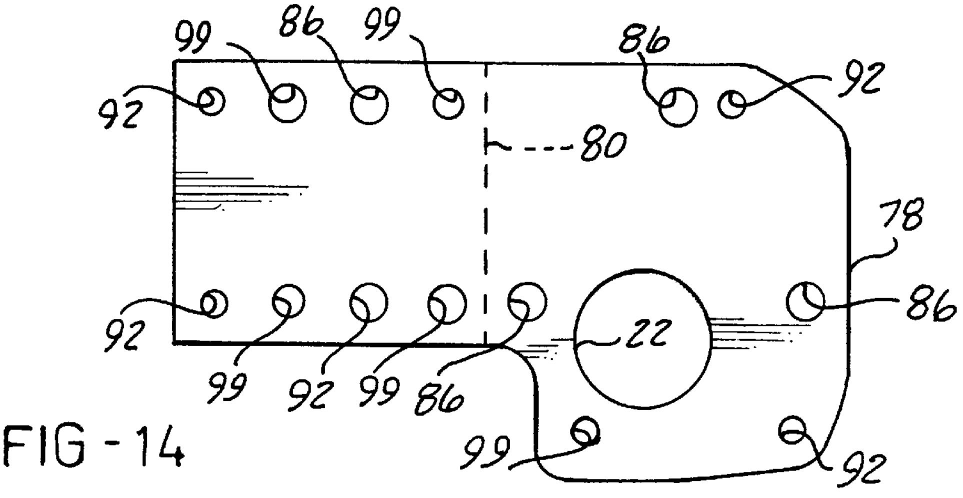
FIG. 14 is a top elevational view of the fifth or bottom planar plate of the power clamp shown in FIG. 9.

In the preferred embodiment, the housing 16 includes four layers of planar plates 76, 78, 82, 84 with a spacer 74 in the center of the housing 16, as seen in FIGS. 8–14. The four planar plates 76, 78, 82, 84 include a top plate 76, as seen in FIG. 12, and a bottom plate 78, as seen in FIG. 14, wherein the bottom plate 78 is a mirror image of the top plate 76 except for the small shoulder 80 provided in both the top plate 76 and the bottom plate 78. The top plate 76 and the bottom plate 78 provide the main walls of the housing 16 and are fabricated from a hardened steel to protect the internal mechanisms of the power clamp 10 and provide the necessary structural support.

Figure 9:
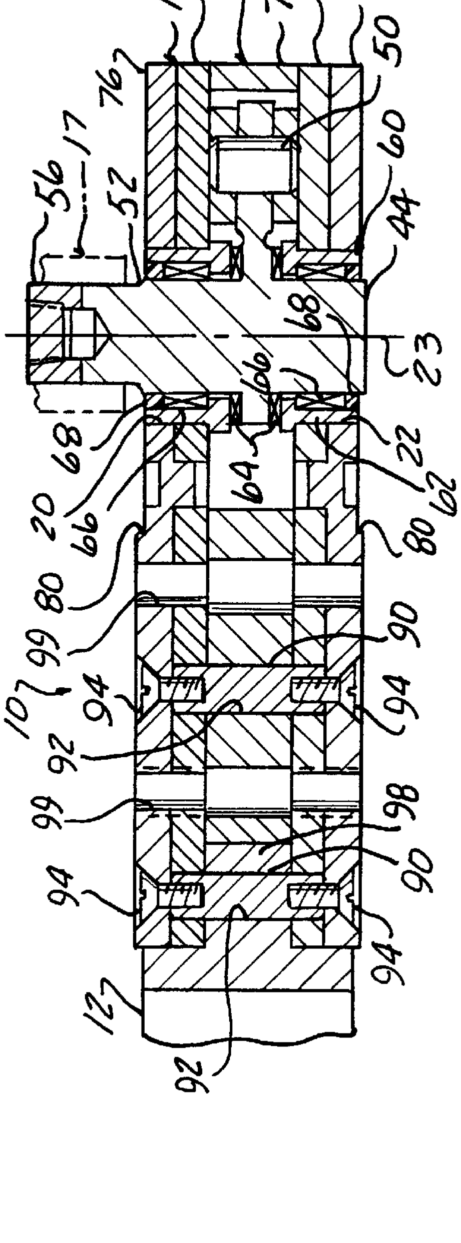
FIG. 9 is a transverse cross sectional view taken along line 9—9 in FIG. 8.

The second plate 82 and the third plate 84 are stacked adjacent the top plate 76 and the bottom plate 78, respectively, as seen in FIGS. 9–11. As seen in FIG. 13, the second plate 82 and the third plate 84 have the same configurations. The second plate 82 and the third plate 84 provide the internal guide slot 18 for the rod end 26 as well as the coaxial apertures 20, 22, respectively, for the pivot pin 52. A substantially square aperture 85 also extends through the second plate 82 and the third plate 84. The square apertures 85 are utilized for receiving the stop block 72 which extends between the second and third plates 82, 84, as seen in FIG. 8. Due to the forces applied by the rod end 26 to the internal guide slot 18, the second plate 82 and the third plate 84 are fabricated from hardened steel to provide the necessary strength to support the internal mechanisms of the power clamp 10.

A securing means secures the first plate 76 to the second plate 82 and the fourth plate 78 to the third plate 84 to form sub-assembled groups of individual planar plates 19. The securing means includes piercing small protrusions 86 in the first plate 76 and the fourth plate 78 wherein the protrusions 86 cooperatively engage apertures 88 provided in the adjacent second and third plates 82, 84, respectively. In addition to or in the alternative, the securing means may include brazing the first plate 76 to the second plate 82 and the third plate 84 to the fourth plate 78 to provide a secured connection between the associated layers.

Within the center of the housing 16, the spacer 74 is utilized to support and space the first and second plates 76, 78 from the third and fourth plates 84, 78. The spacer 74 does not support any of the internal mechanisms of the power clamp 10, and thus, the spacer 74 may be fabricated from a lightweight material such as an aluminum or a polymer. The lightweight materials allow for the reduction of weight and material cost involved in the power clamp 10.

In order to secure the four planar plates 76, 78, 80, 82 and the spacer 74 together to form a cohesive housing 16, a second securing means includes extending five dowel rods 90 through corresponding apertures 92 provided in the housing 16. The dowel rods 90 may be press fit into corresponding apertures 92 provided in the second plate 82, the third plate 84, the spacer 74 and the linear actuator 12. In addition, threaded fasteners 94 extend through apertures 96 provided in the first and fourth plate 76, 78, and the threaded fasteners 94 threadingly engage the ends of the dowel rods 90. The dowel rods 90 and the fasteners 94 are also utilized to connect a tongue 98 of the linear actuator 12 to the housing 16. The tongue 98 is a substantially flat rectangular portion of the linear actuator 12 which extends outwardly therefrom and is utilized to assist in mounting the linear actuator 12 to the housing 16.

In addition, a mounting means is provided to allow for the power clamp 10 to be mounted to a support structure (not shown). The mounting means utilizes a plurality of apertures 99, both threaded and non-threaded, which extend through the planar plates 19 and for which fasteners (not shown) may extend there through to the support structure.

Figure 7:
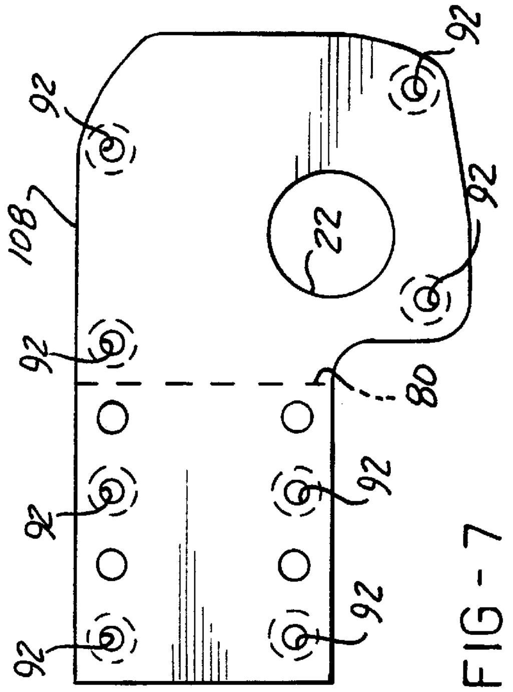
FIG. 7 is a top elevational view of the seventh or bottom planar plate of the power clamp shown in FIG. 2.
Figure 4:
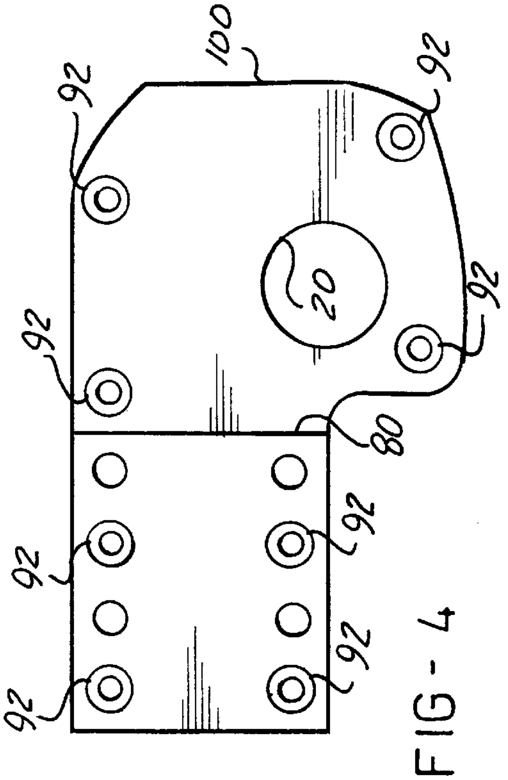
FIG. 4 is a top elevational view of the first or top planar plate of the power clamp shown in FIG. 2.
Figure 5:
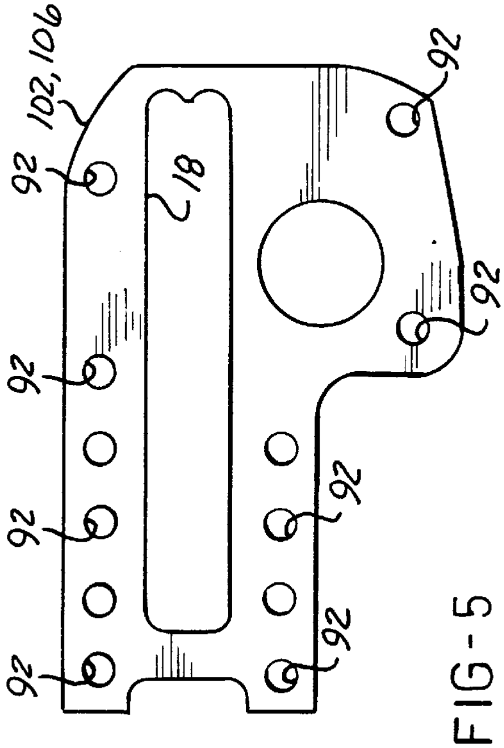
FIG. 5 is a top elevational view of the second and sixth planar plates of the power clamp shown in FIG. 2.

In the second embodiment, the housing 16 includes seven planar plates 100, 102, 104, 106, 108 secured together to form a unitary housing 16. The first plate 100 and the seventh plate 108 form the walls of the housing 16 and are fabricated from a hardened steel to provide the necessary strength to the housing 16. As seen in FIGS. 4 and 7, the first plate 100 and the seventh plate 108 provide coaxial apertures 20 and 22, respectively, as well as apertures for the securing means and the mounting means.

The second plate 102 and the sixth plate 106 have the same configuration, and both provide for the internal guide slot 18 and coaxial apertures 20, 22. Due to the support required for the rod end 26 and the internal guide slot 18, the second plate 102 and the sixth plate 106 are fabricated from a hardened steel to provide the necessary strength to the power clamp 10. In addition, the second plate 102 and the sixth plate 106 also provide the necessary apertures 92 for the securing means and the mounting means.

Figure 6:
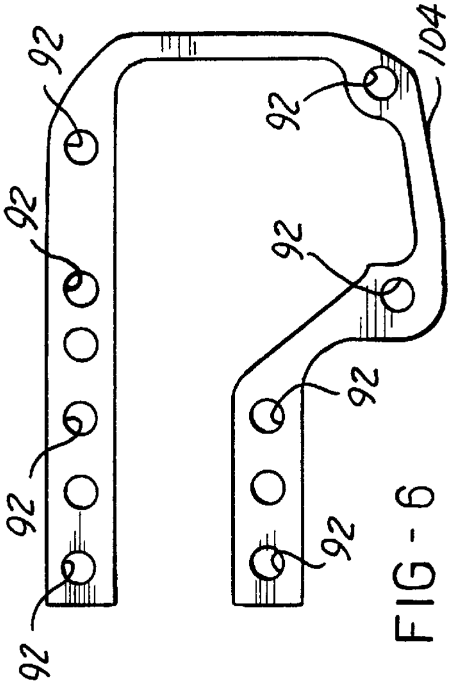
FIG. 6 is a top elevational view of the third, fourth and fifth planar plates shown in the power clamp in FIG. 2.

The third, fourth and fifth plates or three internal plates 104 are all similar, as shown in FIG. 6. The three internal plates 104 provide an open end for the piston rod 14 and the necessary apertures 92 for the securing means and the mounting means. Since the three internal plates 104 do not provide support to the internal mechanisms of the power clamp 10, the three internal plates 104 may be fabricated from a lightweight metal, such as aluminum, or from a high strength polymer material. Such materials allow for the reduced weight of the power clamp 10.

The planar plates 100, 102, 104, 106, 108 are held together by the same securing means described in the preferred embodiment. The securing means provides for the plurality of dowel rods 90 press fit through commonly aligned apertures 92 provided in the planar plates 100, 102, 104, 106, 108. The dowel rods 90 extend through the inner five planar plates 102, 104, 106. The threaded fasteners 94 are utilized to secure the first plate 100 and the seventh plate 108 to the inner plates 102, 104, 106. The threaded fasteners 94 extend through corresponding apertures 92 in the first plate 100 and the seventh plate 108 and are threaded into the ends of the dowel rods 90. A pair of the dowel rods 90 are also utilized to connect the linear actuator 12 to the housing 16 wherein the tongue 98 extends between the second plate 102 and the sixth plate 106. The dowel rods 90 extend through corresponding apertures 92 provided in the tongue 98 of the linear actuator 12 and through corresponding apertures 92 in the second plate 102 and the sixth plate 106. The threaded fasteners 94 are again utilized to secure the first and seventh plates 100, 108 to the remaining plates 102, 104, 106 by extending the fasteners 94 through the apertures 92 in the first and seventh plate 100, 108 and threading the fasteners 94 into the ends of the dowel rods 90.

Figure 16:
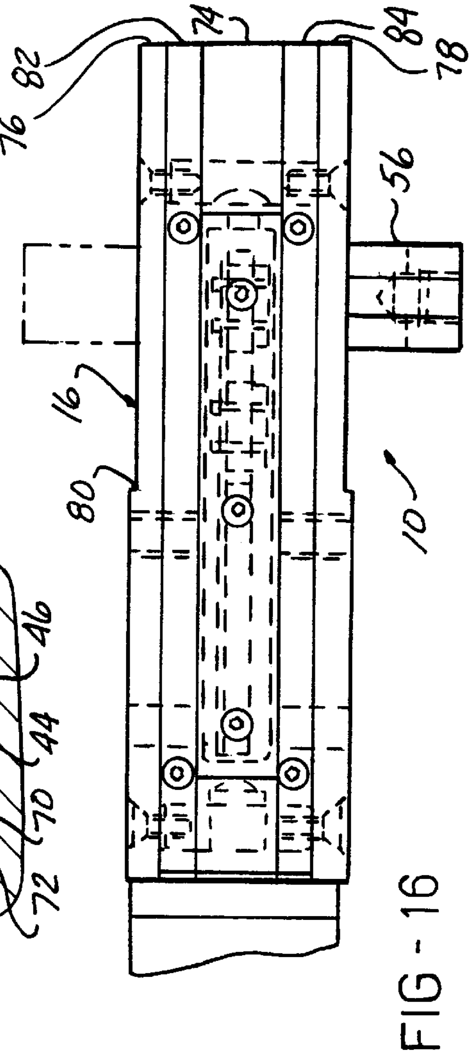
FIG. 16 is a top elevational view of the power clamp shown in FIG. 15.

In a third embodiment, the inner spacer 74 of the housing 16 is adapted for mounting three micro-switches 110 in the top portion of the housing 16, as seen in FIGS. 15 and 16. The inner spacer 74 has a hook configuration wherein the upper side of the spacer 74 is removed to provide an opening in the housing 16 for the mounting of the micro-switches 110. A cover 114 is provided to enclose the micro-switches 110 within the housing 16 and protect the micro-switches 110 from the outside elements. A terminal or plug 116 is mounted in the outside cover 114 for receiving a cable 117 which communicates with a programmable controller or microprocessor 119. The micro-switches 110 are utilized to sense the presence of a tab 112 which extends outwardly from the rod end 26. As the rod end 26 moves along the internal guide slot 18, the micro-switches 110 sense the presence of the tab 112 by feeding the signal to the programmable controller or microprocessor 119. The programmable controller or microprocessor 119 processes the signal and determines the position of the clamp arm 17.

In manufacturing the enclosed power clamp 10, the housing 16 of the power clamp 10 is defined and sectioned into a plurality of planar laminations. Each of the planar laminations may or may not have similar thicknesses depending on the structural requirements of each of the planar laminations. The plurality of planar plates 19 are provided corresponding to the number and thickness of the planar laminations. The proper configurations, corresponding to the planar laminations, are formed into the planar plates 19 using a fine-blanking process. The fine-blanking process is an inexpensive and accurate means by which to form the necessary configurations into the planar plates 19. As previously described, the outer layers of the planar plates 19 of all embodiments are fabricated from hardened steel to provide the necessary structural support to the power clamp 10. As previously described, the inner three planar plates 104 or the inner spacer 74 may be fabricated from a lightweight metal, such as aluminum, or a polymeric material. When the inner three planar plates 104 or spacer 74 are fabricated from a polymeric material, the fine blanking process is not required since the proper configuration may be provided through a molding process.

Once the planar plates 19 have been properly configured to resemble the planar laminations, the outer two layers of planar plates 19 are stacked together in a predetermined sequence corresponding to the planar laminations to form a first group of planar plates 78, 84 and 106, 108 and a second group of planar plates 16, 82 and 100, 102. The first securing means is provided to secure the individual planar plates 19 of the first and second group together to form two cohesive units. In the preferred embodiment, the first securing means includes piercing the outer most planar plates 76, 78 such that the protrusion 86 is cooperatively received by the aperture 88 provided in the adjacent planar plate 82, 84, respectively, of each of the first and second groups. In addition, the planar plates of the first and second groups may be brazed together. In the second embodiment, the planar plates of the first group 106, 108 and the second group 100, 102 are simply brazed together to form cohesive units.

The bearing cartridge 60 and the O-ring seal 68 are press fit into the coaxial apertures 20, 22 provided in the first group 78, 84 and 106, 108 and the second group 76, 82 and 100, 102 of the planar plates 19. The bearing cartridge 60 provides thrust and rotational bearings 64, 66, respectively, as well as the bushing 62.

A sub-assembly of the internal mechanisms of the power clamp 10 is provided and inserted into the first group of the planar plates 78, 84 and 106, 108. The sub-assembly of internal mechanisms include the linear actuator 12, the rod end 26 connected to the linear actuator 12, the pair of opposed links 36 pivotally connected to the rod end 26, and the shaft link 44 pivotally coupled to the opposed pair of links 36. In alternative embodiments, the stop block 72 and/or the microswitchs 110 are included in the sub-assembly of internal mechanisms.

In the preferred embodiment, the spacer 74 is stacked on the first group of planar plates 78, 84 and 106, 108 in a predetermined sequence corresponding to the planar laminations. In the second embodiment, the three inner planar plates 104 are stacked on the first group of planar plates 78, 84 and 106, 108 in a predetermined sequence corresponding to the planar laminations. At this point, the dowel rods 90 may be press fit into the corresponding apertures 92 provided in the stacked planar plates 19. In the alternative, the dowel rods 90 may be press fit into the first group of planar plates 78, 84 and 106, 108 prior to the inner spacer 74 or the inner three planar plates 104 being stacked to the first group of planar plates 78, 84 and 106, 108, or all of the planar plates 19 and spacer 74 may be stacked before press fitting the dowel rods 90 into the corresponding apertures 92. Irregardless of when the dowel rods 90 are press fit, the second group of planar plates 78, 84 and 100, 102 is stacked onto the spacer 74 or the internal three planar plates 104 at a predetermined sequence corresponding to the planar laminations. The threaded fasteners 94 are inserted into the apertures 96 provided for the dowel rods 90, and the threaded fasteners 94 are threaded into the ends of the dowel rods 90. At this point, the enclosed power clamp 10 is assembled, and the clamp arms 17 may be connected to the ends of the pivot pin 52 of the shaft link 44.

While the invention has been described in connection with what is presently considered to be the most practical and preferred embodiment, it is to be understood that the invention is not to be limited to the disclosed embodiments but, on the contrary, it is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for manufacturing an enclosed power clamp, comprising the steps of:

stacking a plurality of planar plates in a predetermined sequence to form a completely enclosed housing having a contiguous perimeter;

assembling internal mechanisms of said power clamp to said enclosed housing; and providing means for securing said planar plates together to form said power clamp.

2. The method defined in claim 1, further comprising the steps of:

providing means for forming a predetermined configuration into each of said planar plates.

3. The method defined in claim 2, wherein said forming means comprises a fine-blanking process.

4. The method defined in claim 1, wherein said securing means comprises a plurality of dowel rods extending through corresponding apertures provided in said planar plates.

5. The method defined in claim 4, further comprising the steps of press fitting said dowel rods into said corresponding apertures.

6. The method defined in claim 4, wherein said securing means further comprises a plurality of fasteners extending through said planar plates and into to said dowel rods.

7. The method defined in claim 1, wherein said planar plates are fabricated from a metallic material.

8. The method defined in claim 1, wherein said planar plates are fabricated from a polymeric material.

9. A method for manufacturing an enclosed power clamp, comprising the steps of:

sectioning a housing of said power clamp into a plurality of planar laminations each having a predetermined thickness;

providing a plurality of planar plates corresponding to the number and thickness of said planar laminations;

providing means for forming a predetermined configuration into each of said planar plates corresponding to said planar laminations;

stacking at least two of said planar plates in a predetermined sequence corresponding to said planar laminations to form a first group and a second group of said planar plates;

providing first means for securing said planar plates of said first group and said second group together to form two separate cohesive units;

providing a sub-assembly of internal mechanisms of said rotary clamp;

assembling said subassembly of internal mechanisms to said first group of said planar plates;

stacking at least one of said planar plates in a predetermined sequence corresponding to said planar laminations to form a spacer;

stacking said spacer to said first group of said planar plates in a predetermined sequence corresponding to said planar laminations;

stacking said second group of said planar plates to said spacer and said first group of said planar plates in a predetermined sequence corresponding to said planar laminations; and providing second means for securing said first group of said planar plates, said spacer, and said second group of said planar plates into an integral unit to form said rotary clamp.

10. The method defined in claim 9, wherein said first and second groups of said planar plates are fabricated from a metal.

11. The method defined in claim 9, wherein said spacer is fabricated from a polymeric material.

12. The method defined in claim 9, wherein said spacer is fabricated from aluminum.

13. The method defined in claim 9, wherein said forming means comprises a fine-blanking process.

14. The method defined in claim 9, wherein said second securing means comprises a plurality of dowel rods extending through corresponding apertures provided in said planar plates.

15. The method defined in claim 14, wherein said second securing means further comprises the steps of press fitting said dowel rods into said corresponding apertures.

16. The method defined in claim 14, wherein said second securing means further comprises a plurality of fasteners extending through said planar plates and connected to said dowel rods.

17. The method defined in claim 9, wherein said first securing means comprises brazing said planar sheets together.

18. The method defined in claim 9, wherein said first securing means comprises piercing said planar sheets wherein at least one protruding surface is formed on at least one of said planar plates in each of said first and second groups of planar plates, and said protruding surfaces complementarily engaging apertures provided in another of said planar plates in each of said first and second groups of planar plates.

19. The method of claim 9, wherein said subassembly of said internal mechanisms comprise:

a linear actuator for actuating said power clamp;

a rod end connected to said linear actuator;

a pair of links pivotally coupled with said rod end;

a shaft link pivotally coupled to said pair of links;

a bearing cartridge for rotatably supporting said shaft link; and a flexible seal for sealing said shaft link with respect to said planar plates.

20. The method defined in claim 19, further comprising:

a prestop bar extending between said first and second groups of planar plates to provide a positive stop to said shaft link during actuation of said power clamp.

21. The method defined in claim 19, further comprising:

a plurality of micro-switches for sensing the position of said rod end.

22. The method defined in claim 19, further comprising:

at least one clamp arm connected to said shaft link.

23. A method of manufacturing an enclosed power clamp, comprising the steps of:

sectioning a housing of said power clamp into a plurality of planar laminations each having a predetermined thickness;

providing a plurality of metallic planar plates corresponding to the number and thickness of said planar laminations;

fine-blanking a predetermined configuration into each of said metallic planar plates to correspond to said planar laminations;

stacking at least two of said planar plates in a predetermined sequence corresponding to said planar laminations to form a first group and a second group of planar plates;

providing first means for securing said planar plates of said first group and second group together to form two separate cohesive units;

press fitting a bearing cartridge and a flexible seal in said predetermined configuration formed in each of said first group and said second group of said planar plates;

providing a sub-assembly of internal mechanisms of said rotary clamp;

inserting said sub-assembly of internal mechanisms into said first group of planar plates;

stacking a spacer on said first group of planar plates in a predetermined sequence corresponding to said planar laminations;

stacking said second group of planar plates to said spacer and said first group of planar plates in a predetermined sequence corresponding to said planar laminations; and providing second means for securing said first group of planar plates, said spacer, and said second group of planar plates into an integral unit to form said rotary clamp.

24. The method defined in claim 23, wherein said spacer is fabricated from a polymeric material.

25. The method defined in claim 23, wherein said spacer is fabricated from aluminum.

26. The method defined in claim 23, wherein said second securing means comprises a plurality of dowel rods extending through corresponding apertures provided in said planar plates.

27. The method defined in claim 23, further comprising the steps of:

press fitting said dowel rods into said corresponding apertures provided in said planar plates.

28. The method defined in claim 23, wherein said second securing means further comprises a plurality of fasteners extending through said planar plates and threadingly engaging said dowel rods.

29. The method defined in claim 23, wherein said first securing means comprises brazing said planar plates together.

30. The method defined in claim 23, wherein said first securing means comprises piercing said at least one of said planar plates in each of said first and second group of planar plates to form at least one raised surface for complementarily engaging another of said planar plates of said first and second groups of said planar plates.

31. The method defined in claim 23, wherein said subassembly of said internal mechanisms of said rotary clamp comprises:

a linear actuator for actuating said power clamps;

a rod end connected to said actuator;

a pair of opposed links pivotally connected with said rod end; and a shaft link pivotally coupled to said pair of opposed links.

32. The method defined in claim 31, further comprising a prestop bar extending between said first and second groups of said planar plates to provide a positive stop to said shaft link during actuation of said power clamp.

33. The method defined in claim 31, further comprising a plurality of micro-switches for sensing the position of said rod end.

34. The method defined in claim 31, further comprising at least one clamp arm connected to said shaft link.

35. A method for manufacturing an enclosed power clamp, comprising the steps of:

stacking a plurality of plates side-by-side in a predetermined sequence to form housing means for defining an enclosure having an enclosed path including an elongate guide slot, and a pair of coaxial apertures extending perpendicular to and offset from said elongate guide slot wherein said housing means is completely enclosed with a contiguous perimeter;

operably engaging internal means with said elongate slot within said housing means for moving along said enclosed path between first and second end limits of travel; and securing said plates together to form a unitary structure.

36. An enclosed power clamp manufactured according to the method of claim 35 comprising:

housing means having a plurality of plates stacked side-by-side in a predetermined sequence for defining an enclosed path including an elongate guide slot, and a pair of coaxial apertures extending perpendicular to and offset from said elongate guide slot;

internal means operably engageable with said elongate guide slot within said housing means for moving along said enclosed path between first and second end limits of travel; and means for securing said plates together to form a unitary structure.

37. An enclosed power clamp comprising:

housing means having a plurality of plates stacked side-by-side in a predetermined sequence for defining an enclosure including an elongate guide slot, and a pair of coaxial apertures extending perpendicular to and offset from said elongate guide slot wherein said housing means is completely enclosed with a contiguous perimeter;

internal means operably engageable with said elongate guide slot within said housing means for moving along said elongate guide slot between first and second end limits of travel; and means for securing said plates together to form a unitary structure.

38. In an enclosed power clamp having a housing enclosing a slide block connectable to a prime mover for driving the slide block in movement between first and second end limits of travel along an elongate guide slot formed in the housing, link means connected to the slide block at one end and a pivot pin at another end for converting linear movement of the slide block into rotational movement of the pivot pin, the pivot pin rotatably supported in the housing and connectable to a clamp arm for driving the clamp arm between a clamped position and a released position, the improvement comprising:

said housing formed of at least five elongate plates stacked side-by-side in a predetermined sequence formed to be completely enclosed having a contiguous perimeter and to define an enclosed path for receiving said slide block, each plate having first and second major opposite parallel side surfaces spaced from one another with at least one transverse edge surface extending between said first and second side surfaces defining an outer perimeter of each plate, at least four of said plates each having at least one transverse surface substantially perpendicular to said first and second side surfaces extending completely through said corresponding plate to communicate with said first and second side surfaces to form a first aperture through each of said at least four plates, said first aperture of each plate alignable in coaxial relationship through said four plates when said plates are stacked side-by-side in said predetermined sequence, at least two of said four plates each having a second transverse surface substantially perpendicular to said first and second side surfaces extending completely through said corresponding plate to communicate with said first and second side surfaces to form said elongate guide slot, and said fifth plate defining a spacer interposed between said two plates forming said elongate guide slot and the other two of said four plates sandwiched to opposite outer sides of said two plates; and means for securing said plates to one another to form a unitary structure.

* * * * *